United States Patent [19]

Miyauchi et al.

[11] Patent Number: 4,851,267

[45] Date of Patent: Jul. 25, 1989

[54] METHOD OF FORMING WEAR-RESISTANT MATERIAL

[75] Inventors: Mikiyoshi Miyauchi; Takashi Meguro, both of Numazu; Hisao Serizawa, Susono; Hiroaki Kusanagi, Numazu, all of Japan

[73] Assignee: Toshiba Kikai Kabushiki Kaisha, Tokyo, Japan

[21] Appl. No.: 87,938

[22] Filed: Aug. 21, 1987

[30] Foreign Application Priority Data

Aug. 21, 1986 [JP] Japan .................... 61-196362

[51] Int. Cl.$^4$ .................... B05D 1/02; B05D 3/02; B05D 3/12
[52] U.S. Cl. .................... 427/357; 264/60; 264/67; 427/356; 427/369; 427/376.6; 427/419.7; 427/427
[58] Field of Search ............... 427/419.7, 427, 376.6, 427/380, 355, 356, 358, 357, 369; 264/60, 67

[56] References Cited

U.S. PATENT DOCUMENTS

| | | | |
|---|---|---|---|
| 2,735,155 | 2/1956 | Glaser | 264/67 X |
| 3,031,340 | 4/1962 | Girardot | 427/229 X |
| 3,523,569 | 8/1970 | Quaas | 427/427 X |
| 3,754,968 | 8/1973 | Reznik | 427/369 |
| 4,173,685 | 11/1979 | Weatherly | 427/190 X |

FOREIGN PATENT DOCUMENTS

61-92823  5/1986  Japan .

OTHER PUBLICATIONS

Perry, R. H. et al., "Chemical Engineers' Handbook", Fifth Edition, New York, McGraw-Hill Book Company, 1973, inside front cover.

*Primary Examiner*—Evan Lawrence
*Attorney, Agent, or Firm*—Cushman, Darby & Cushman

[57] ABSTRACT

A method of coating a metal article comprising the steps of mixing a slurry of carbides or borides of metals selected from the group consisting of metals belonging to groups IVB and VIB of the periodic table, an organic binder and an organic solvent and then spray coating the slurry on the surface of the article, then machining the coating on the article, and heating the article under pressure so that the organic binder in the coating is heated and eliminated, and placing a metallic binder and the coated article in a furnace whereupon the metallic binder is dissolved and combined with the article.

6 Claims, 2 Drawing Sheets

FIG. I
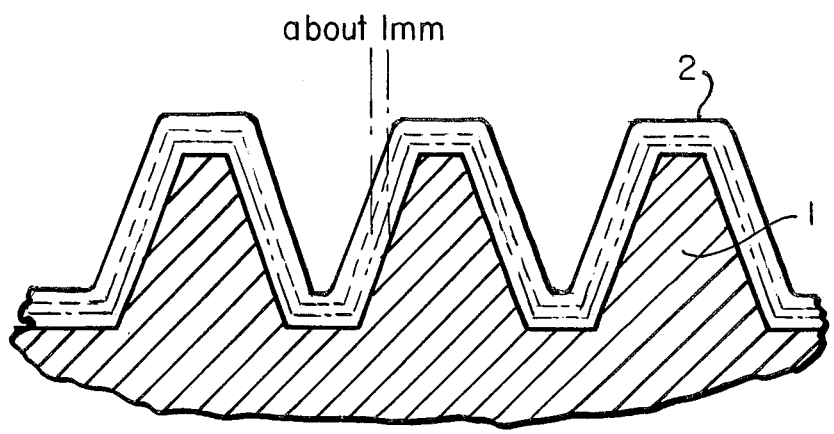
FIG. 2
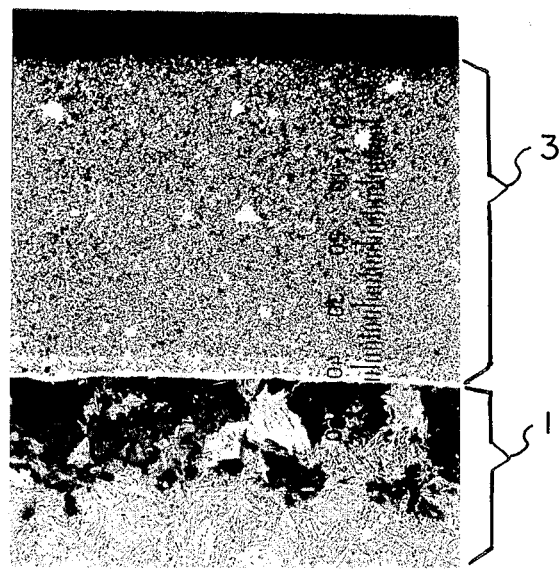

F I G. 3
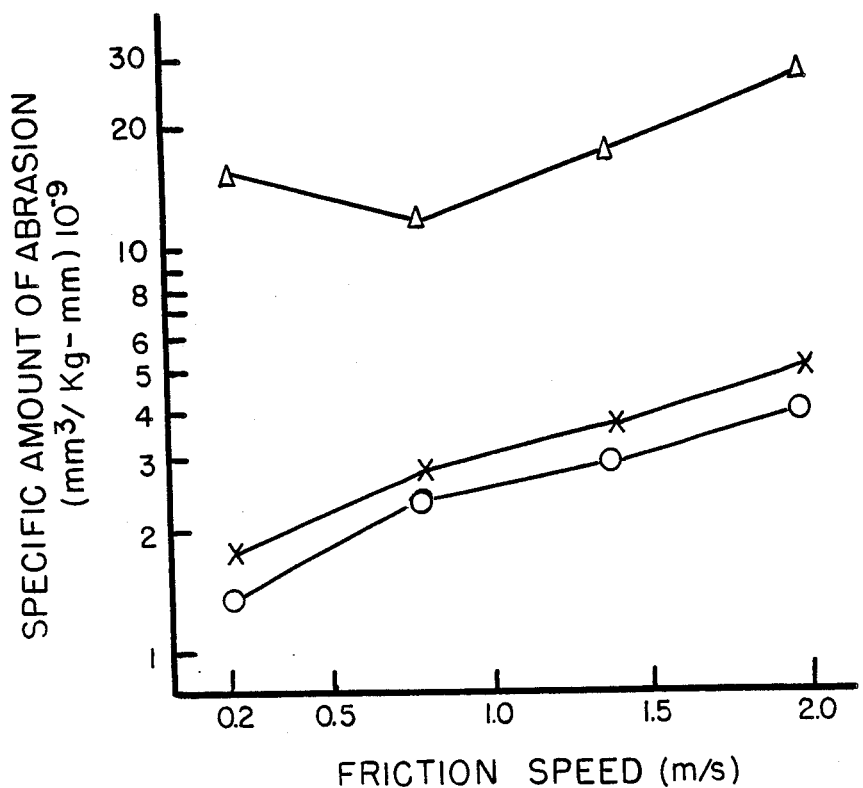

METHOD OF FORMING WEAR-RESISTANT MATERIAL

BACKGROUND OF THE INVENTION

This invention relates to a method for forming a wear-resistant coating on the surface of a metallic article, and more particularly, to a method of forming a wear-resistant coating on the surface of a machine part which may be used for a plastic forming machine.

Conventionally, the formation of a wear-resistant coating on an article has been carried out by methods of spray coating the article or laminating the article alternatively with a wear-resistant powder of metal and a slurry of ceramic and then sintering the article.

When the spray coating method is used, the coating comes off easily because the coating has a thickness of about 0.2 mm, which is too thin to withstand "Herz Stress" and is held on the machine part by a small adhering force.

When the laminating and sintering method is used, it is considerably difficult to form the coating uniformly because the powder of the metal permeates into the powder of the ceramic after sintering. Also, it takes a lot of time to machine a sintered workpiece because the surface of the sintered workpiece is rough because the organic binder reacts or melts at the boundary areas between the ceramic and the metal layers.

SUMMARY OF THE INVENTION

It is an object of the present invention to provide a wear resistant coating on a metal article which is held to the article by a strong adhering force.

It is another object of the present invention to provide a coating for an article which has minimum roughness on the surface.

According to the present invention, a slurry is made of carbides or borides of metals belonging to groups IVB and VIB of the periodic table and an organic binder. This slurry is coated on the surface of the article. The coating is machined. After machining, the coated article is placed in a sintering furnace with a metal binder so that the organic binder in the coating is eliminated. The metallic binder being capable of forming a matrix with the metal carbide or boride in the coating is dissolved so as to permeate into the coating, thereby combining or joining the metal binder with the article.

In another embodiment, a slurry is made of carbides or borides of metals belonging to groups IVB and VIB of the periodic table and an organic binder, and then coated on the article. The article is then molded with pressure and machined. The article is then heated in a sintering furnace and a metal binder and the organic binder is eliminated. The metallic binder being capable of forming a matrix with the carbide or boride of metal in the coating is dissolved so as to permeate into the coating thereby joining the metal binder with the article.

BRIEF DESCRIPTION OF THE DRAWINGS

FIG. 1 is a longitudinal-sectional view of a tungsten carbide (WC) slurry coated on the surface of a metal article.

FIG. 2 is a magnified microscopic photograph of a coated section of the coated article in accordance with the present invention after sintering.

FIG. 3 is a graph showing the results of an abrasion test of the wear-resistant coating formed in the present invention.

DETAILED DESCRIPTION OF THE PREFERRED EMBODIMENT

In the method of the subject invention a mixture of an organic solvent, an organic binder and a carbide or boride of a group IVB or group VIB metal is formed into a slurry. The ratio of metal carbide or boride to organic binder to organic solvent is 100:0.8~1.3:10~16 by weight. The metal boride or carbide is in powder form with a particle size of approximately 50 microns. This slurry is sprayed on the metal article to coat. The spray coating of the article leaves metal carbide or boride powder stuck to the surface of the article. The coating is then machined to a thickness of about 1.0 mm. The coated article is placed in a sintering furnace along with a metal binder. The metal binder is selected from the group consisting of nickel-based self-melting alloys and cobalt-based self-melting alloys. This metal binder is capable of forming a matrix with the metal carbide or boride. The coated article is heated from 0° to about 450° C. at a rate of 30° C./hour. It is then heated from 400° C. to about 1100° C. at a rate of 5° C./minute and finally heated at 1100° C. for 30 minutes. The article is then cooled to room temperature in the sintering furnace. The pressure inside the sintering furnace is between $1 \times 10^{-2}$ and approximately $1 \times 10^{-1}$ Torr throughout the heating and cooling process. The metal binder particles are thereby fused and permeate into the coating.

EXAMPLE ONE

A slurry is formed by mixing WC powder having a particle size of less than 50 microns with acrylic resin and methyl ethyl ketone. The acrylic resin is the organic binder and the methyl ethyl ketone is the organic solvent. They are mixed in the ratio of 100:1:14. The material which is used to form a worm gear is AISI 4135H. The worm gear is machined so that it is smaller than the final desired size. Next, the slurry is coated on the surface of worm gear with a spray device. Then the coating on the surface of worm gear is machined by lathe until the thickness of the coating is about 1.0 mm (as illustrated in FIG. 1). Next, fine particles of a Ni-based self melting alloy (i.e., having a melting point of 450°–1100° C.), a metallic binder, capable of forming a matrix with the WC powder are placed in a melting pot, and the worm gear is placed (vertically) in the melting pot. These materials are heated from 0°–400° C. at a rate of 30° C./H, from 400°–1100° C. at a rate of 5° C./min, and at 1100° C. for 30 minutes and then cooled to room temperature in a sintering furnace at a degree of vacuum of $1 \times 10^{-2}$–$1 \times 10^{-1}$ Torr.

The fine particles of Ni-based self melting alloy are thereby fused and permeate into the coating.

Table 1 shows the composition of the above described Ni-base self-melting alloy.

TABLE 1

| | (% by weight) | | | | |
|---|---|---|---|---|---|
| Ni | B | Si | Fe | C | others |
| Balance | 2.52 | 4.70 | 1.5 | 0.15 | 0.5 |

After coating, in this way (WC) powder is stuck to the surface of the worm gear through an acrylic resin, after that acrylic resin is evaporated, and fused in during heat.

In sintering, a wear-resistant coating is formed and is combined with the material which forms the worm gear by permeating nickel (Ni)-based selfmelting alloy into the coating.

FIG. 2 is a magnified microscopic photograph of a coated section of the worm gear thus formed. A wear-resistant coating is combined firmly with the material which forms the worm gear.

EXAMPLE TWO

A mixture of slurry is formed by mixing $MO_2B_5$ powder having a particle size of less than 50 microns with an acrylic resin and a methyl ethyl ketone, acrylic resin being the organic binder and methyl ethyl ketone being the organic solvent. They are mixed in the ratio of 100:1:14 by weight. The material forming the worm gear is AISI 4135H. The worm gear is machined so that it is smaller than the desired finished size.

Next, the slurry is coated on the surface of the worm gear which is rotating at 5 rpm with a spray device. The coating is then machined by lathe until its thickness is about 1.0 mm.

Next, fine particles of a Ni-based selfmelting alloy being capable of being used in matrix are placed in a melting pot, and the worm gear is placed vertically in the melting pot.

These materials are heated from 0°–400° C. at a rate of 30° C./H, from 400°–1100° C. at a rate of 5° C./min, and at 1100° C. for 30 minutes in a sintering furnace at a degree of vacuum of $1 \times 10^{-2} - 1 \times 10^{-1}$ Torr. The fine particles of Ni-based self-melting alloy are thereby fused and permeate into the mixture of slurry, and these materials are thereafter cooled to room temperature at the same pressure.

Table 2 shows the composition of the abovedescribed Ni-base self-melting alloy.

TABLE 2

| Ni | B | Si | Fe | C | Others |
|---|---|---|---|---|---|
| (% by weight) | | | | | |
| Balance | 2.52 | 4.70 | 1.5 | 0.15 | 0.5 |

In sintering, a wear-resistant coating is formed and is combined with the material which forms the worm gear by permeating nickel (Ni)-based selfmelting alloy into the coating.

The hardness of the coating is within the limits of HV 800–1000. The hardness of material which forms the worm gear is HRC 10. FIG. 3 shows the specific amount of abrasion with respect to the wear resistant coating of the Examples in accordance with the present invention. As is apparent from FIG. 3, the Examples of the present invention are also superior to high-speed steel which is ASTM M36 with a hardness HRC of 62 in terms of the wearresisting property.

In a test carried out by employing a Ogoshi-type abrader, the testing member of the abrasion test is ASTM D2 (metal steel based on Japanese Industrial Standard (HRC 58) (symbol showing the Rockwell Hardness), the abrasion distance is 600 m, pressing load is 18.9 kgf, and the specific amount of abrasion is an amount of abrasion at an abrasion distance of 1 m and a pressing load of 1 kgf.

In the example of the present invention, though the mixture of slurry is coated on the surface of the wear-resistant material, bubbles and irregular densities may be observed.

But, if a CIP (Cold Isostatic Pressing) treatment for the mixture of slurry is employed, bubbles and irregular densities are not observed. When the thickness of the mold is 3 mm, bubbles are not observed in a pressure of 1000 kg/cm² when a CIP treatment is employed. In this invention, it is possible to form a thin wearresistant coating and to form the coating having no defect.

In addition, it does not take a lot of time to machine the article after sintering because of the smooth surface of the coating. In addition, the coating is formed at a low cost as compared with conventional methods.

What is claimed is:

1. A method of forming a wear-resistant coating on a metal article comprising the steps of:
   mixing a slurry comprising carbides or borides of metals selected from the group consisting of metals belonging to groups IVB and VIB of the periodic table and an organic binder;
   spraying the slurry on the article to form a coating;
   machining the coating to a desired thickness;
   placing the coated article in a sintering furnace along with a metal binder; and
   heating said coated article and said metal binder in the furnace so as to eliminate said organic binder from the coating and to permeate said metal binder into said coating thereby joining said metal binder with said article.

2. The method of forming a wear-resistant coating according to claim 1, wherein
   said metal binder is selected from the group consisting of nickel-based self-melting alloys and cobalt-based self-melting alloys.

3. A method of forming a wear-resistant coating on a metal article comprising the steps of:
   mixing into a slurry carbides or borides of metals selected from the group consisting of metals belonging to groups IVB and VIB of the periodic table and an organic binder;
   spraying the slurry on the article to form a coating;
   molding said coating with compression;
   machining the coating to a desired thickness;
   placing the coated article in a sintering furnace along with a metal binder; and
   heating said coated article and said metal binder in the furnace so as to eliminate said organic binder from the coating, and to permeate the metal binder into said coating, thereby joining said metal binder with said article.

4. The method according to claim 3 wherein said metal binder is selected from the group consisting of nickel-based self-melting alloys and cobalt-based self-melting alloys.

5. A method of forming a wear-resistant coating on a metal article comprising the steps of:
   mixing a slurry comprising an organic binder, an organic solvent, and carbides or borides of metals selected from the group consisting of metals belonging to groups IVB and VIB of the periodic table;
   spraying the slurry on the article to form a coating;
   machining the coating to a desired thickness;
   placing the coated article in a sintering furnace along with a metal binder; and
   heating said coated article and said metal binder in the furnace so as to eliminate said organic binder from the coating and to permeate said metal binder into said coating thereby joining said metal binder with said article.

6. The method of forming a wear-resistant coating according to claim 5, wherein
   said metal binder is selected from the group consisting of nickel-based self-melting alloys and cobalt-based self-melting alloys.

* * * * *